US012760792B2

(12) United States Patent
Lysik

(10) Patent No.: US 12,760,792 B2
(45) Date of Patent: Oct. 13, 2026

(54) AUTOMATIC TRANSMISSION CONTROL SYSTEM UTILIZING PADDLE SHIFTERS

(71) Applicant: CANshift LLC, Roseville, MI (US)

(72) Inventor: Jonathon Lysik, Roseville, MI (US)

(73) Assignee: CANSHIFT LLC, Roseville, MI (US)

( * ) Notice: Subject to any disclaimer, the term of this patent is extended or adjusted under 35 U.S.C. 154(b) by 0 days.

(21) Appl. No.: 19/033,116

(22) Filed: Jan. 21, 2025

(65) Prior Publication Data

US 2025/0320916 A1 Oct. 16, 2025

Related U.S. Application Data

(63) Continuation-in-part of application No. 17/590,770, filed on Feb. 1, 2022, now abandoned.

(60) Provisional application No. 63/144,149, filed on Feb. 1, 2021.

(51) Int. Cl.
*F16H 59/02* (2006.01)
*B60K 20/06* (2006.01)

(52) U.S. Cl.
CPC ......... *F16H 59/0204* (2013.01); *B60K 20/06* (2013.01); *F16H 2059/0247* (2013.01)

(58) Field of Classification Search
CPC ......... F16H 59/0204; F16H 2059/0247; B60K 20/06; H04L 67/12; H04W 4/48
See application file for complete search history.

(56) References Cited

U.S. PATENT DOCUMENTS 8,973,701 B2 * 3/2015 Holihan .............. F16H 59/0278 74/552
10,793,225 B2 * 10/2020 Lin ........................ B62M 25/08

* cited by examiner

*Primary Examiner* — Huan Le

(57) ABSTRACT

A shift system and methodology for use in relation to the automatic transmission of a vehicle is provided. The system includes a paddle shifter arrangement adapted to be operated by a driver to manually and selectively shift the gears of the transmission. The paddle shifter system includes steering wheel-mounted or hand-held paddles to allow the operator to make upshift or downshift requests. The paddles comprise a mechanical switch, a transmitter, and a conventional power source. A computing module capable of interfacing with the vehicle via the Unified Diagnostic Services protocol is provided. A number of components are installed on the module to support device functionality. These components include operating components, flash storage, display driver and communication circuitry. The system includes a wireless communication system that allows the user to link the paddles and the computing module. A display indicates the current vehicle gear and gear requested by the driver.

20 Claims, 11 Drawing Sheets

AUTOMATIC TRANSMISSION CONTROL SYSTEM UTILIZING PADDLE SHIFTERS

CROSS REFERENCE TO RELATED APPLICATION

This application is a US. Non-provisional patent application of U.S. Provisional Patent Application No. 63/144,149, entitled "Automatic Transmission Control System Utilizing Paddle Shifters," filed Feb. 1, 2021, which is herein incorporated by reference in its entirety for all purposes.

BACKGROUND OF THE INVENTION

Field of the Invention

The disclosed inventive concept relates generally to shift systems for vehicles having automatic transmissions. More particularly, the disclosed inventive concept relates to an automatic transmission control systems that enables a driver to selectively request forward motion gears that may not be normally be commanded by the shift strategy programmed into a vehicle's powertrain control module.

Description of the Related Art

It is known to have paddle shifters provided in vehicles to permit a driver to manually shift the vehicle's gears without the necessity of a traditional clutch pedal or gear shift mechanism. Conventionally these systems are provided with the vehicle as a factory installed component. The prior art does not provide for a practical and cost-effective method or system for retrofitting such control mechanisms to an existing vehicle. In addition, current paddle shifters require extensive wiring, re-wiring or other hardware modifications to adapt the shifters to existing vehicles.

Accordingly, a system that may be installed in a vehicle after the vehicle is manufactured is desirable. To be practical to the consumer, such a system must be practical, easily installed, and of a cost that is reasonable.

SUMMARY OF THE INVENTION

The disclosed inventive concept provides a response to the need for a practical, easily adapted, and cost-effective arrangement for retrofitting a paddle shift system to an existing vehicle. As set forth herein, the system is for use in a vehicle having an engine and an associated automatic transmission. The shift system includes a paddle shifter arrangement adapted to be operated by a vehicle driver to manually and selectively shift the gears of the automatic transmission.

The disclosed inventive concept provides a solution to the need for such a system by providing an arrangement that integrates directly with the existing vehicle system without the need for external modification. The system enables the driver to selectively command forward motion gears.

More particularly, the disclosed inventive concept provides a combination automatic transmission control system that includes:

A pair of steering wheel-mounted paddles to allow the vehicle operator to make upshift or downshift requests. The paddles are comprised of a mechanical switch, a transmitter, and a conventional power source.

Alternatively or additionally, the paddles may be hand-held thus enabling impaired drivers to "manually" control the automatic transmission.

A computing module (client) capable of interfacing with the vehicle via the Unified Diagnostic Services (UDS) protocol is provided. A number of components are operatively installed on the computing module for the purpose of supporting device functionality. These components include operating system components, flash storage, display driver and communication circuitry.

A wireless communication system that allows the user to link the paddles and the computing module system for wireless communication between the paddles and the computing module.

The display can be any type of display such as 7-segment or an LCD that provides visual confirmation of gear change requests as well as enables the user to configure parameters of the disclosed inventive concept.

The system of the disclosed inventive concept constantly monitors the current vehicle gear and any inputs made by the driver via the input paddles. When the system is "activated," the driver can request the transmission to be either upshifted or downshifted by pressing the corresponding paddle. The computing module compares the current vehicle gear to the gear requested, and if permitted by established logic, advances this request to the disclosed transmission control system. The success of the command is notified to the driver by way of the display incorporated into the computing module.

The system of the disclosed inventive concept offers the further advantage of being readily "activated" or "deactivated" on-the-fly. Thus it is not necessary for the vehicle to be at a standstill before engaging or disengaging the system.

The present invention allows for wireless communication between the opposed buttons or paddles and the computing module. This wireless transmission may be accomplished by a variety of means, such as through any number of common low-power, short range wireless radio communication.

The system of the disclosed inventive concept can be readily fitted to existing vehicle systems whether or not the manufacturer offered paddle shifters as an option.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 5B is a perspective view of the pair of the left side paddle shifter assembly shown in FIG. 3B;

DETAILED DESCRIPTION OF THE PREFERRED EMBODIMENT

The drawings disclose the preferred embodiments of the present invention. While the configurations according to the illustrated embodiment are preferred, it is envisioned that alternate configurations of the present invention may be adopted without deviating from the invention as portrayed. The preferred embodiments are discussed hereafter.

Figure 1:
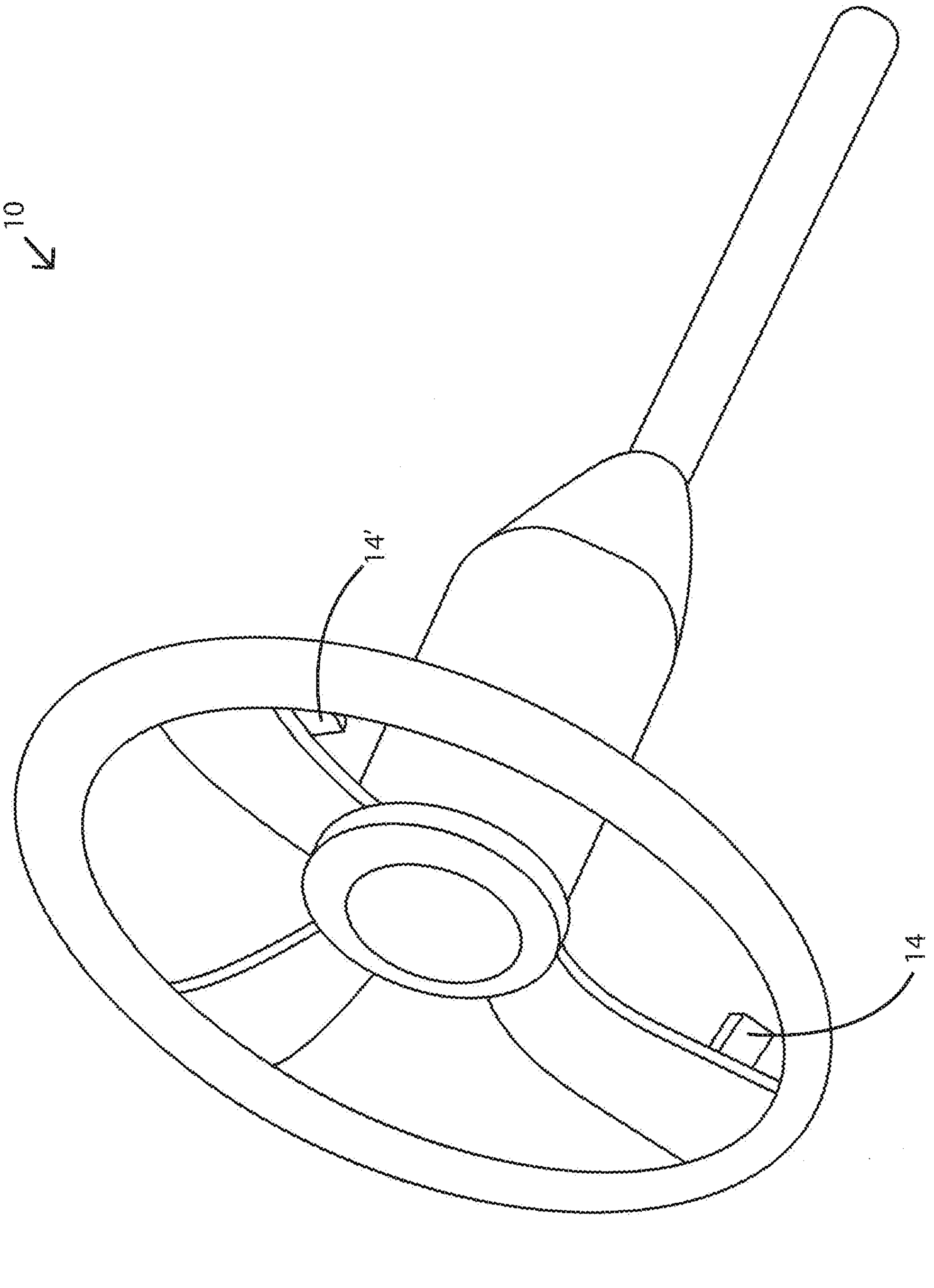
FIG. 1 is a perspective view of a steering wheel assembly which includes the paddle shifter assembly for use in the system described herein.

With respect to FIG. 1, a steering wheel and column assembly 10 is illustrated. It is to be understood that the illustrated steering wheel and column assembly 10 as shown is suggestive and is not intended as being limiting. The steering wheel and column assembly 10 includes a first paddle shifter 14 and a second paddle shifter 14'.

Figure 2:
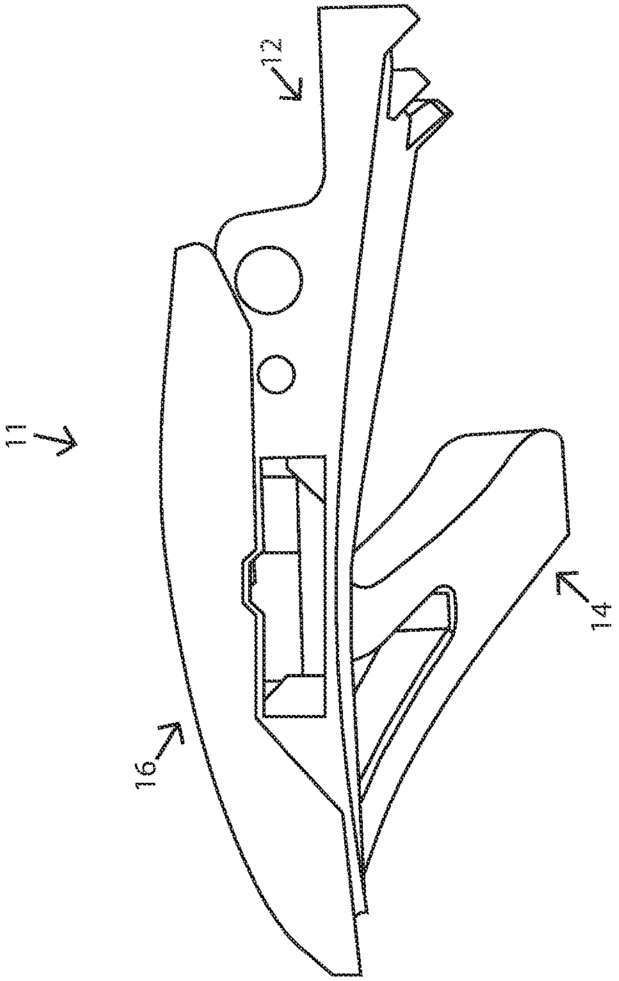
FIG. 2 is a perspective view of an exemplary paddle shifter assembly for use in the system described herein.

With respect to FIG. 2, a paddle shifter assembly, generally illustrated as 11, is shown. The paddle shifter assembly 11 includes a base 12 to which is attached the paddle shifter 14. Attached to the base 12 and the paddle shifter 14 is a housing 16. The housing 16 encloses the assembly switches and transmitter used to request an up-shift or a down-shift from the driver. The paddle shifter assembly 10 is attached to the vehicle's steering wheel (not shown) and provide the operational touch points of the system for the driver.

Figure 3A:
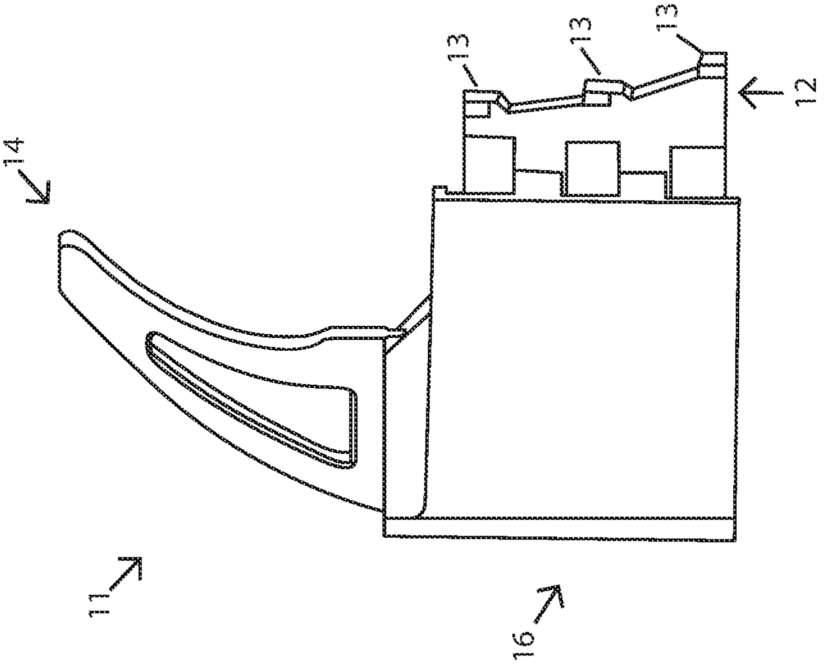
FIG. 3A is a frontal view of a left side paddle shifter assembly for use in the system described herein.
Figure 3B:
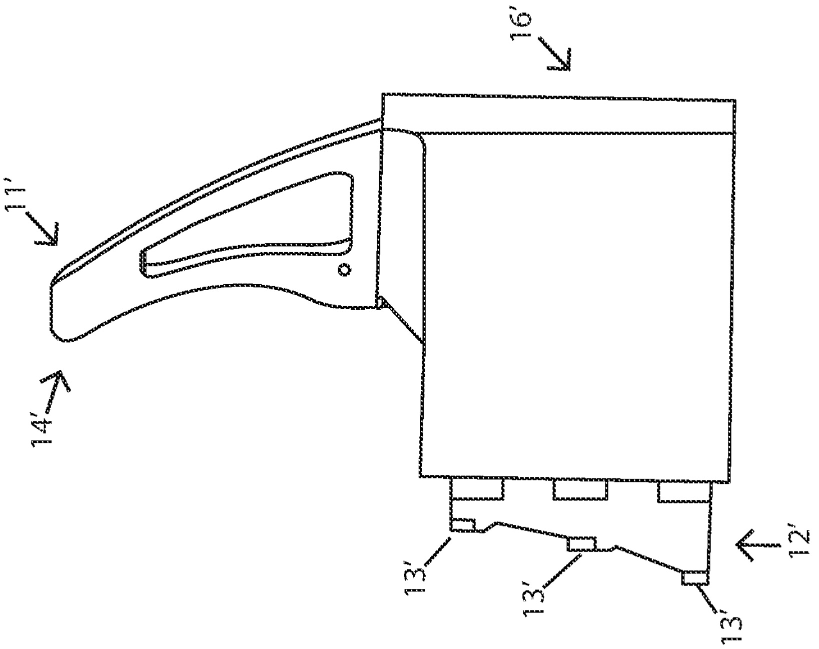
FIG. 3B is a frontal view of a right paddle shifter assembly for use in the system described herein.
Figure 3C:
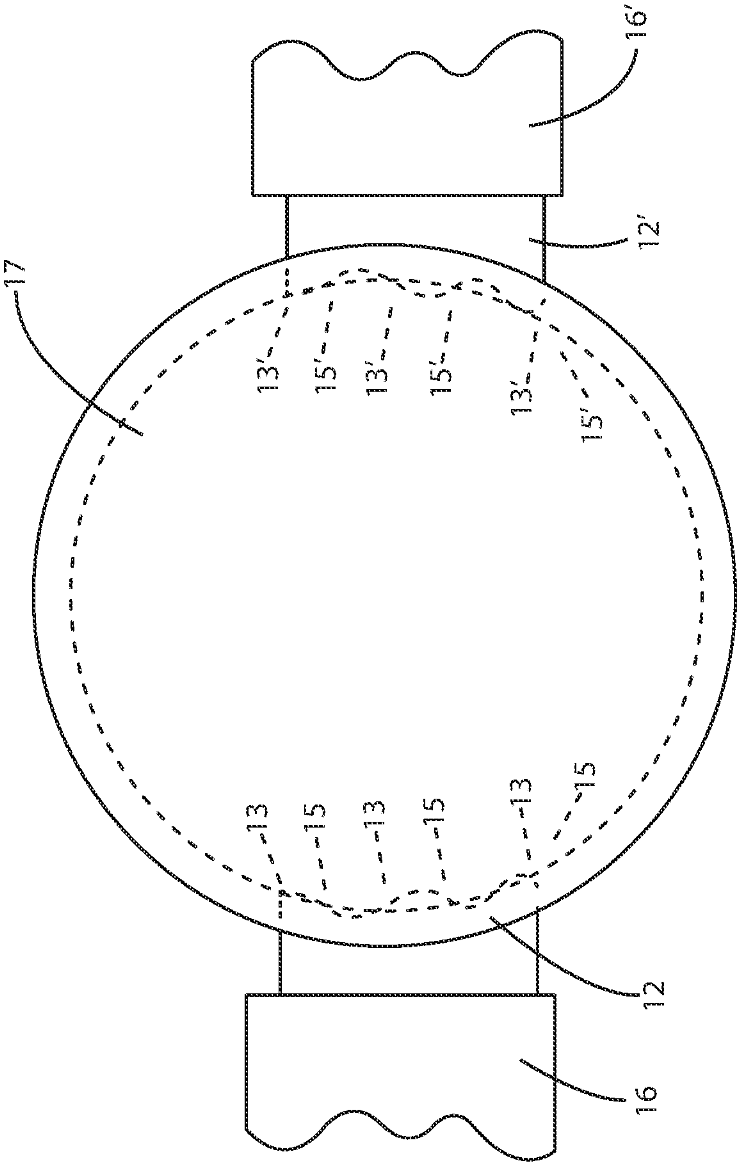
FIG. 3C is a view of the paddle shifters attached to a steering column aligned by pins cooperating with slots formed in the steering column.
Figure 4B:
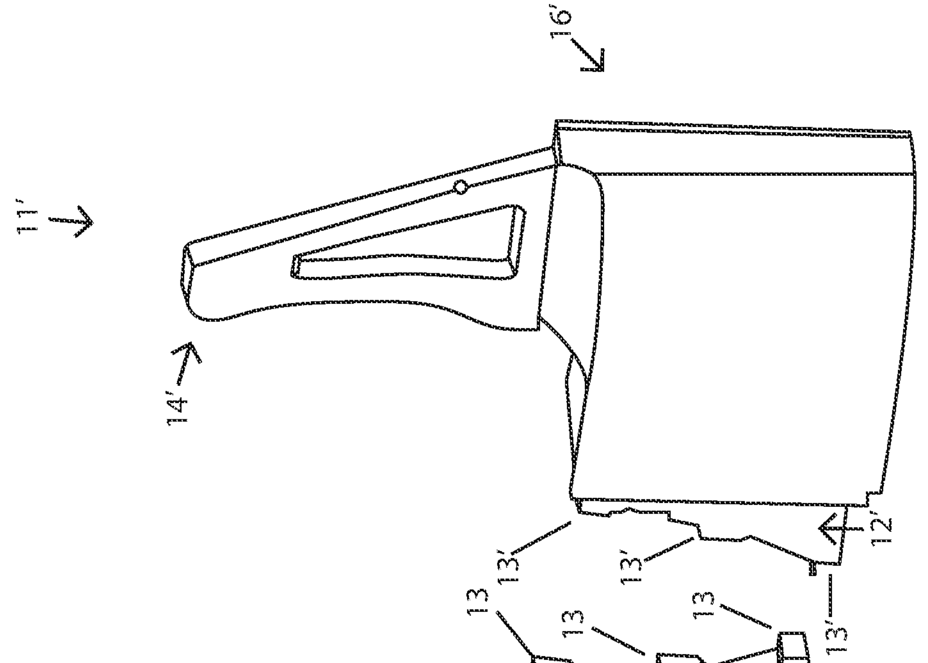
FIG. 4B is a perspective view of the pair of the left side paddle shifter assembly shown in FIG. 3B.
Figure 4A:
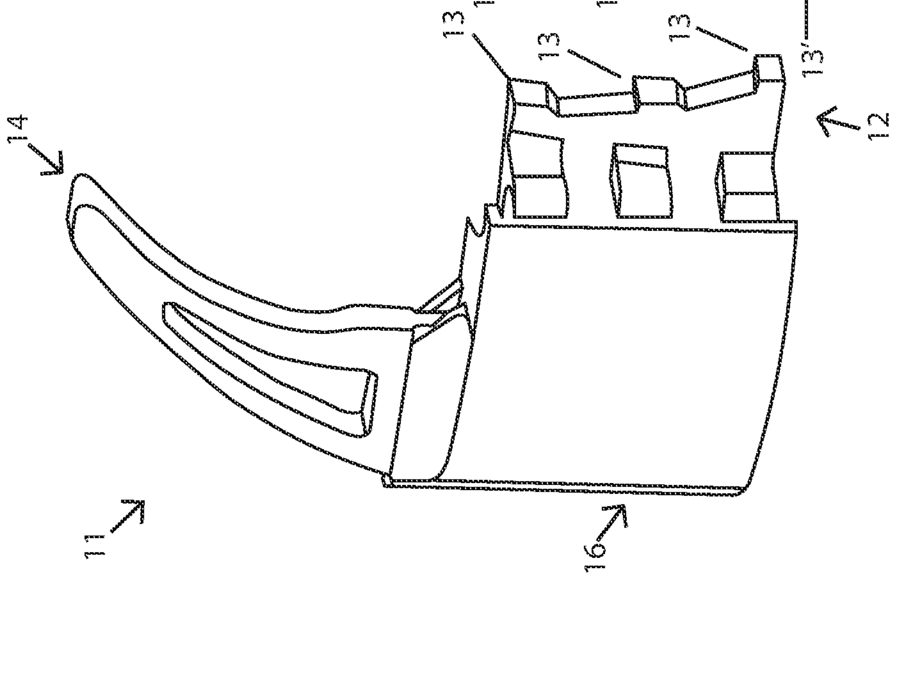
FIG. 4A is a perspective view of the pair of the left side paddle shifter assembly shown in FIG. 3A.

With respect to FIGS. 3A and 3B, side-by-side paddle shifters 11, 11' are illustrated in front views. With respect to FIGS. 4A and 4B, side-by-side paddle shifters 11, 11' are illustrated in front perspective views. Each paddle shifter assembly includes bases 12, 12' to which are attached paddle shifters 14, 14'. The base 12 includes at least one alignment pin 13 and, as illustrated includes three alignment pins 13. The base 12' includes at least one alignment pin 13' and, as illustrated includes three alignment pins 13'. A greater or lesser number of alignment pins 13, 13' may be adopted for use in the present invention depending on the vehicle. The alignment pins 13, 13' allow the installer to place the paddle shifters 10, 10' in a predetermined ideal position relative to the steering wheel. xxx As illustrated in FIG. 3C, the alignment pins 13 cooperate with alignment slots 15 formed in a steering column 17. The alignment pins 13' cooperate with alignment slots 15' formed in the steering column 17.

Attached respectively to the bases 12, 12' and the paddle shifters 14, 14' are housings 16, 16'. The housings 16, 16' enclose the assembly switches and transmitters used to request an up-shift or a down-shift from the driver. The paddle shifter assemblies 10, 10' are attached to the vehicle's steering wheel (not shown) and provide the operational touch points of the system for the driver.

Figure 5:
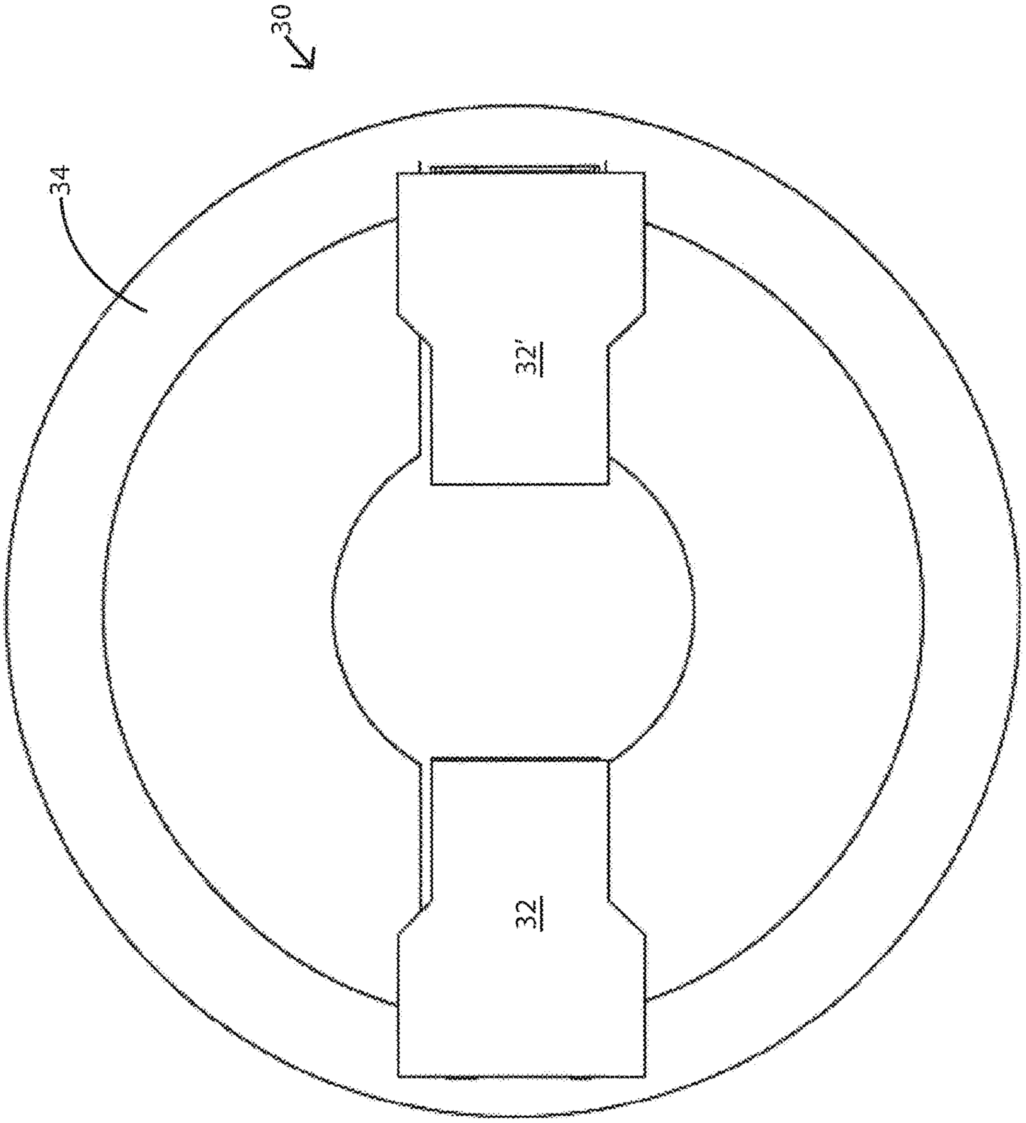
FIG. 5 is an underside view of an alternate paddle shifter arrangement according to the system described herein.
Figure 6:
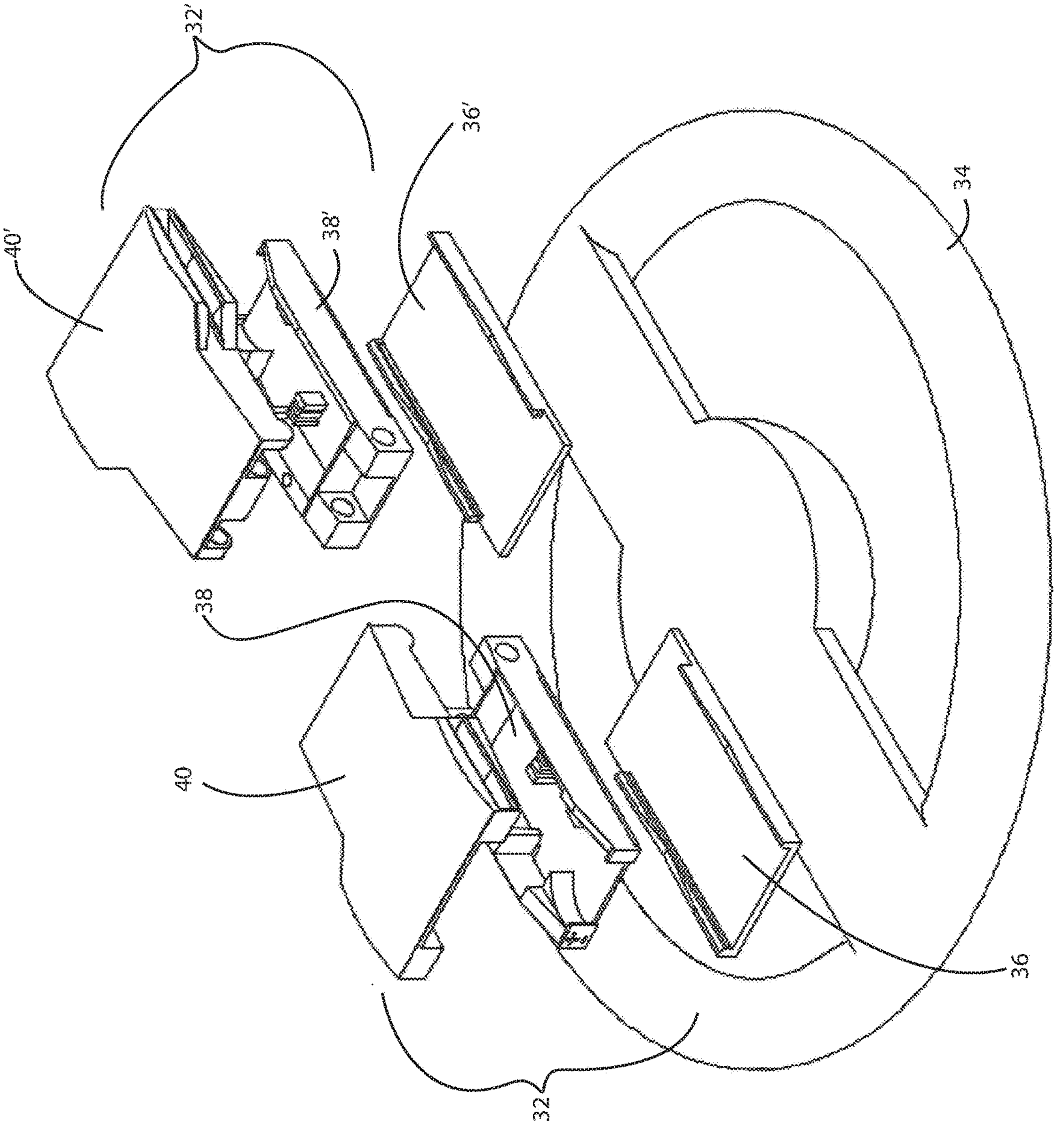
FIG. 6 is a perspective view of the alternate paddle shifter arrangement illustrated in FIG. 5 illustrates the paddle shifter components in an exploded view.

With respect to FIGS. 5 and 6, an alternate panel shifter assembly is generally illustrated as 30. FIG. 5 illustrates the underside of the assembly 30 which includes a pair of shifter assemblies 32 and 32' mounted on the underside of a steering wheel 34. According to the illustrated arrangement, the shifter assembly 32 includes a base 36 fitted to the underside of the steering wheel 34 and a paddle base 38 which optionally may be slidably mounted to the base 36. A paddle 40 is pivotably attached to the paddle base 38 for use by the vehicle operator. Also as illustrated in FIGS. 5 and 6, the shifter assembly 32' includes a base 36' fitted to the underside of the steering wheel 34 and a paddle base 38' which optionally may be slidably mounted to the base 36'. A paddle 40' is pivotably attached to the paddle base 38' for use by the vehicle operator.

Figure 7:
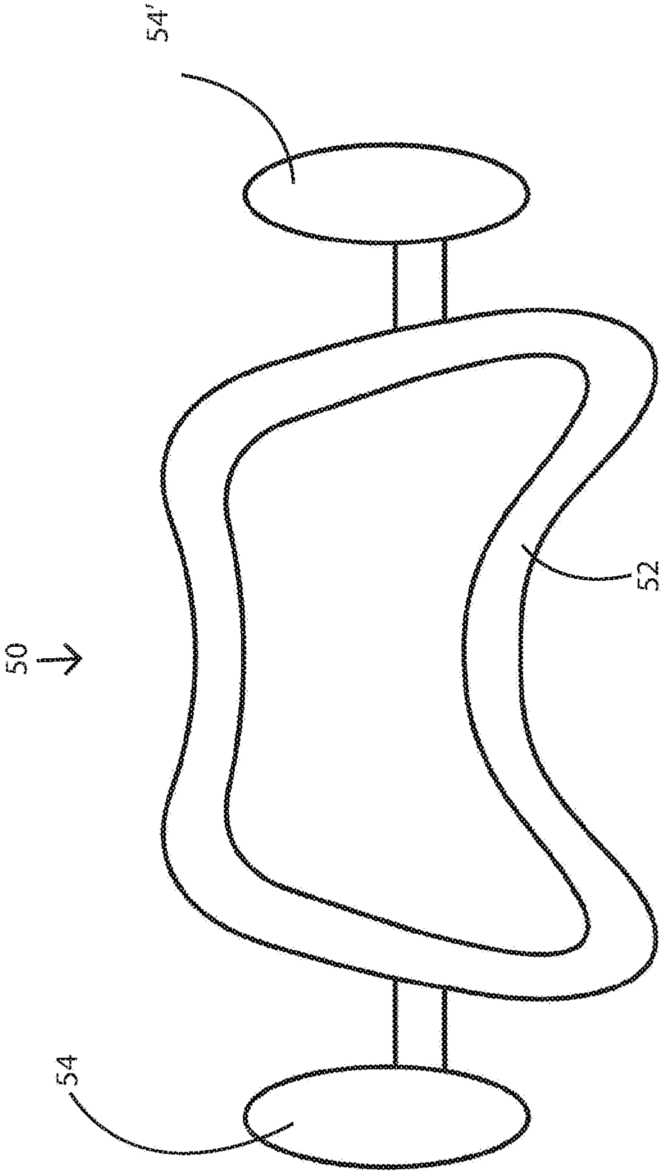
FIG. 7 is a front view of a wireless, hand-held paddle shifter controller.

With respect to FIG. 7, a front view of an exemplary, non-limiting wireless, hand-held paddle shifter controller 50 is illustrated. The hand-held paddle shifter controller 50 includes a body 52 paddle shifters 54, 54'. This arrangement allows a physically impaired user to operate the shifters remotely.

Figure 8:
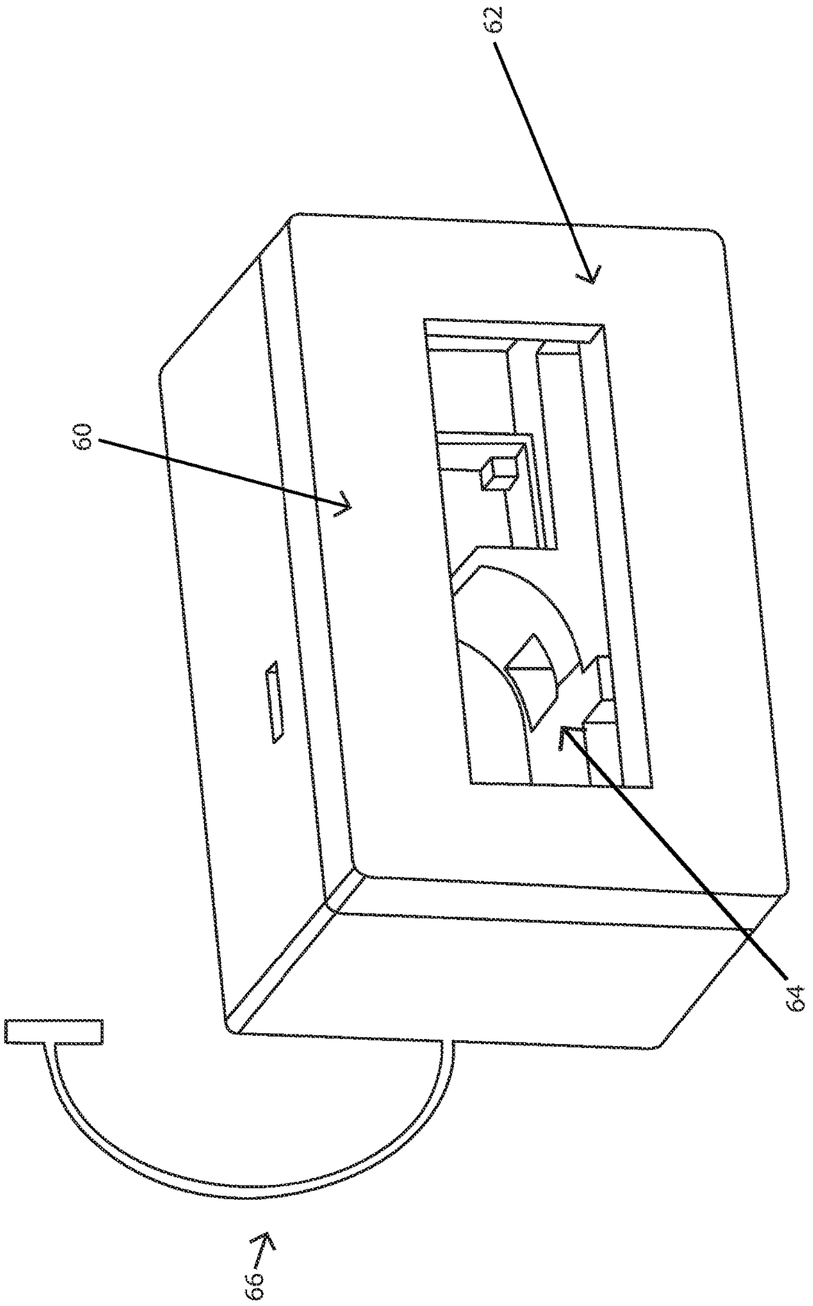
FIG. 8 is a front perspective view of the computing module used in association with the paddle shifter assembly and the automotive vehicle.

With respect to FIG. 8, a perspective front view of a computing module 60 for use in association with the paddle shifter assemblies 11, 11' is illustrated. The computing module 60 includes a housing 62. The housing 62 includes an internal receiver to function as the receiving end of the transmitters housed in the housings 16, 16'. A display 64 is incorporated into the computing module 60 to indicate the operator's gear selection. The display 64 can be any type of display such as 7-segment or an LCD that provides visual confirmation of gear change requests as well as enables the user to configure preferred parameters.

Figure 9:
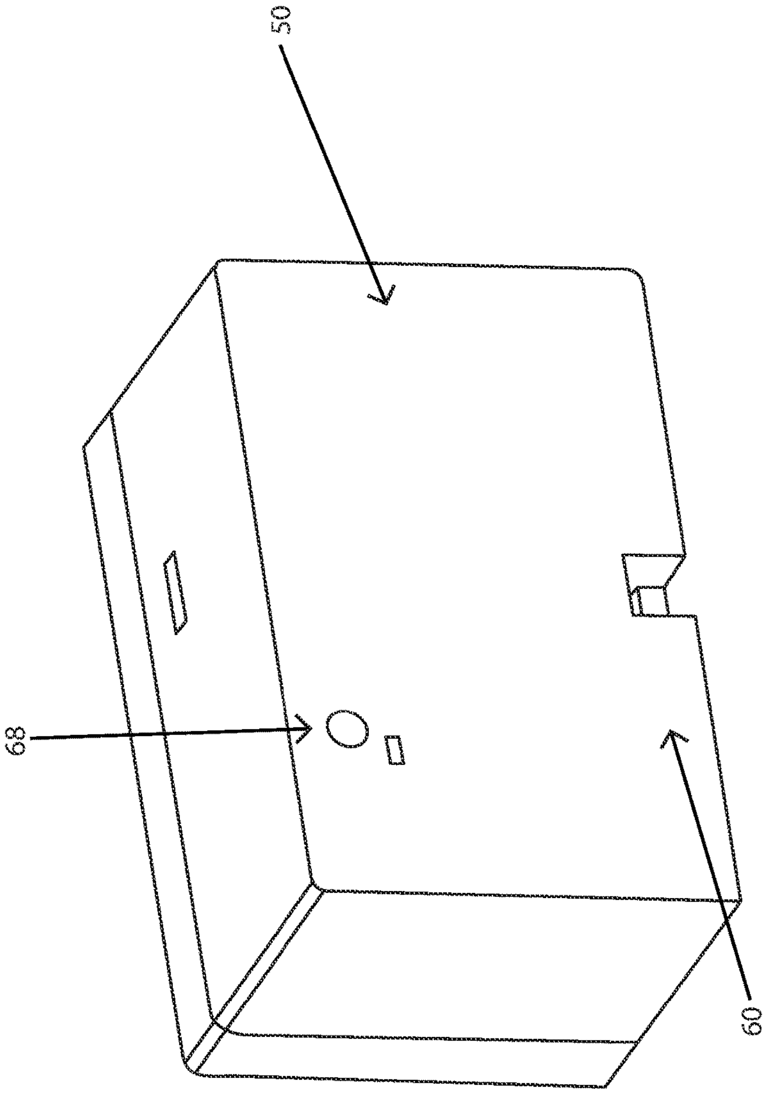
FIG. 9 is a rear perspective view of the computing module shown in FIG. 4.

With respect to FIG. 9, a perspective rear view of the computing module 60 for use in association with the paddle shifter assemblies 11, 11' is illustrated. The computing module 60 includes an arrangement for pairing the wireless paddle shifter assemblies 11, 11' to the vehicle to allow for operation. For an added measure of operator security, the pairing is unique/secure per paddle<->computing module set. As illustrated, pairing may be engaged by way of a pairing button 68 or may be by another arrangement.

A connection cable 66 extends from the housing 62 for attachment to the vehicle via a Data Link Connector (DLC), thereby allowing the system to interface with the vehicle's operational systems. The connection cable includes a terminal plug as is known in the art such as a standard J1962 or other standard plug. Accordingly, no vehicle modification is required for installation of the disclosed system.

In addition, the computing module 60 includes proprietary software necessary to perform the operational functions of the system. The proprietary software includes the algorithms, logic, and decision tree necessary for complete system operation.

Figure 10:
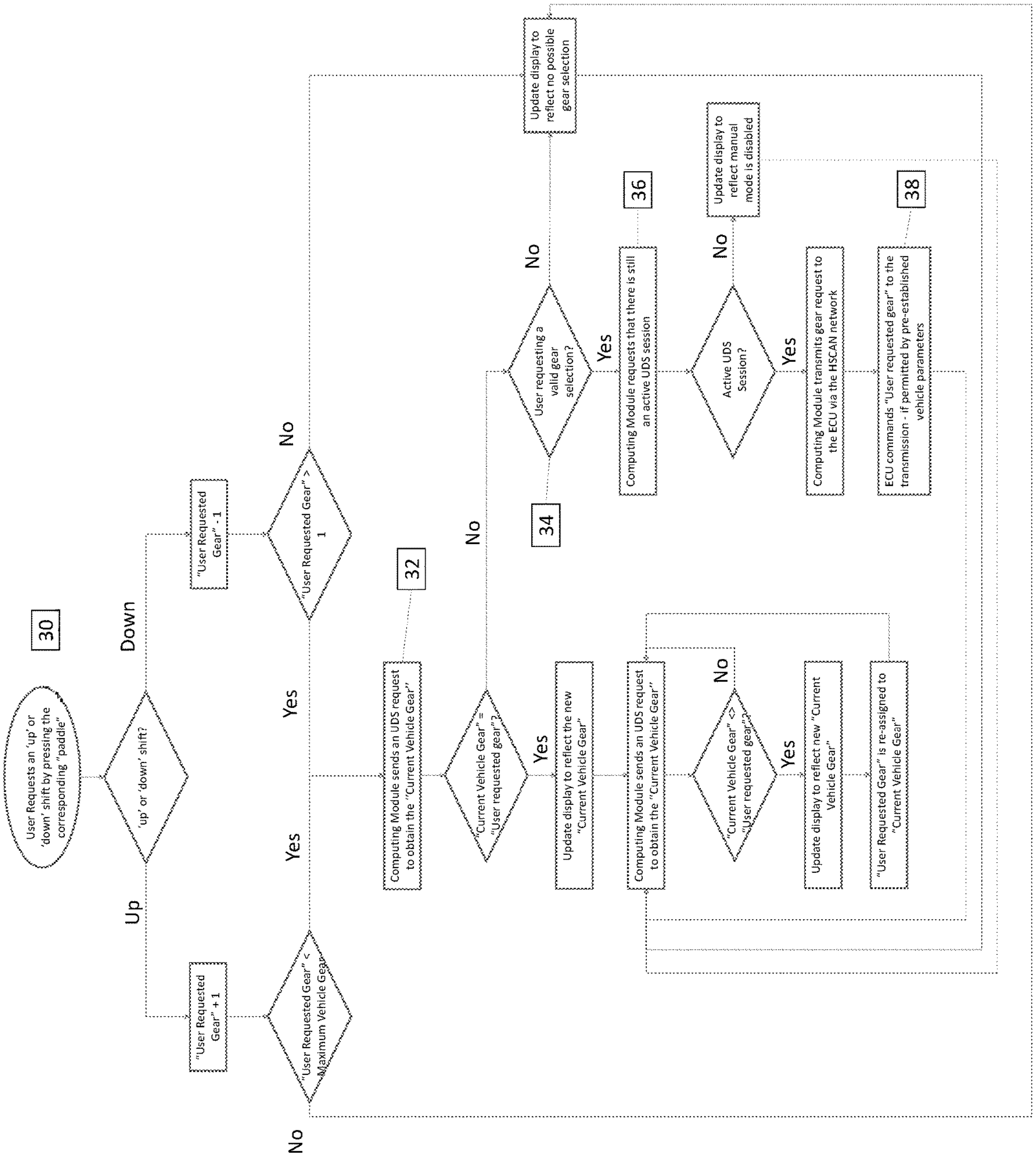
FIG. 10 is a flow chart illustrating the operative steps of the disclosed inventive concept.

With respect to FIG. 10, a step-wise flow chart illustrates the operative steps of the disclosed inventive concept.

At Step 30, the user presses the appropriate paddle or switch 11, 11' to request either an "up" shift or a "down" shift.

At Step 32, the computing module 60 compares the current vehicle gear to the gear requested by the operator; The computing module 60 undertakes a preliminary check to determine which gear to request from the electronic control unit (ECU) or electronic control module (ECM).

At Step 34, an inquiry is made by the computing module 60 as to whether or not the user is requesting a valid gear selection. If the inquiry results in a negative decision, then the display 64 is updated to indicate that the requested gear selection cannot be made.

Conversely, if the inquiry results in a positive decision, then the computing module 60 requests whether or not there is still an active UDS session. A person skilled in the art will recognize that other vehicle communication protocols may also be utilized and that their respective interfaces are well within the embodiments of this invention.

If no active UDS session is indicated, then the display 64 is updated to reflect that the manual mode is disabled.

Conversely, if an active UDS session is indicated, then the computing module transmits the gear request to the ECU via the HSCAN network.

Thereafter, at Step 38, the ECU commands "user requested gear" to the transmission if permitted by pre-established vehicle parameters for the vehicle.

One skilled in the art will readily recognize from such discussion, and from the accompanying drawings, that various changes, modifications and variations can be made therein without departing from the true spirit and fair scope of the invention as set forth.

What is claimed is:

1. A paddle shifter system for an automotive vehicle for facilitating wireless user selection of the gear of an automatic transmission of a vehicle, the vehicle including an operational system, the system comprising:

a pair of wireless shifter assemblies, each of said assemblies including a housing having a set of alignment pins extending therefrom, the alignment pins being parallel to one another;

a computing module to which said pair of shifter assemblies is wirelessly connected, the computing module being operatively associated with the vehicle's operational system, the computing module having logic to determine if a shift may be permitted; and a gear selection display operatively associated with and incorporated into the computing module.

2. The paddle shifter system of claim 1 wherein the vehicle's operational system includes one or both of an electronic control unit and an electronic control module.

3. The paddle shifter system of claim 1 wherein the vehicle includes a steering wheel and steering column assembly and the paddle shifter assemblies are operatively associated with the steering wheel and steering column assembly.

4. The paddle shifter system of claim 3 wherein the steering column includes a first side and a second side and one paddle shifter assembly is fitted to the first side of the steering column and the other paddle shifter assembly is fitted to the second side of the steering column.

5. The paddle shifter system of claim 1 further including a mechanism for pairing the paddle wireless assemblies to the computing module.

6. The paddle shifter system of claim 1 further including a data link connector connecting the computing module to the vehicle's operational system.

7. The paddle shifter system of claim 1 wherein the computing module uses a unified diagnostic services protocol.

8. The paddle shifter system of claim 1 wherein each of said wireless shifter assemblies includes at least one alignment pin for aligning the assembly with the steering wheel and steering column assembly.

9. The paddle shifter system of claim 1 further including a wireless, remote, hand-held paddle shifter controller to which the pair of wireless shifter assemblies are attached.

10. A paddle shifter system for an automotive vehicle for facilitating user selection of a gear of an automatic transmission of a vehicle, the vehicle including an operational system having one or both of an electronic control unit and an electronic control module, the system comprising:

at least one wireless shifter assembly, the wireless shifter assembly including a housing having a set of alignment pins extending therefrom, the alignment pins being parallel to one another;

a computing module to which the at least one wireless shifter assembly is wirelessly connected, the computing module being operatively associated with the vehicle's operational system, the computing module having logic to determine if a shift may be permitted; and a data link connecting the computing module to the vehicle's operational system; and a gear selection display operatively associated with and incorporated into the computing module.

11. The paddle shifter system of claim 10 wherein the vehicle includes a steering wheel and steering column assembly and wherein the at least one wireless shifter assembly is operatively associated with the steering wheel and steering column assembly.

12. The paddle shifter system of claim 11 wherein the steering column includes a first side and a second side and wherein one paddle shifter assembly is fitted to the first side of the steering column and one paddle shifter assembly is fitted to the second side of the steering column.

13. The paddle shifter system of claim 12 further including an apparatus for pairing the paddle wireless assemblies to the computing module.

14. The paddle shifter system of claim 13 wherein the apparatus for pairing is operatively associated with the computing module.

15. The paddle shifter system of claim 10 wherein the computing module uses a unified diagnostic services protocol.

16. The paddle shifter system of claim 10 wherein each of said wireless shifter assemblies includes at least one alignment pin for aligning the assembly with the steering wheel and steering column assembly.

17. The paddle shifter system of claim 10 further including a wireless, remote, hand-held paddle shifter controller to which the at least one shifter assembly is attached.

18. A method for manually shifting an automatic transmission of an automotive vehicle by hand operation of the operator, the method including the steps of forming an assembly including at least one manual shifter wirelessly connected to a computing module, the at least one manual shifter assembly having a housing with a set of alignment pins extending therefrom, the alignment pins being parallel to one another, the computing module being operatively associated with one or both of the vehicle's electronic control unit and electronic control module and a display and incorporated into the computing module;

manipulating the manual shifter to request either an upshift or a downshift by the operator;

comparing a current vehicle gear to a gear requested by the operator, the comparison being undertaken by the computing module to determine if a shift is permitted by established logic;

preliminarily checking to determine which gear to request from the electronic control unit or electronic control module, the checking being made by the computing module;

inquiring whether or not the user is requesting a valid gear selection, the inquiry being made by the computing module, whereby if the inquiry results in a negative decision, then the display is updated to indicate that the requested gear selection cannot be made or if the inquiry results in an positive decision, then the computing module transmits the gear request to the electronic control unit or electronic control module which communicates the gear selection to the vehicle's transmission provided that the gear selection request falls within pre-established parameters for the vehicle; and inquiring whether or not the requested gear change has occurred, the inquiry being made by the computing module, whereby if the inquiry results in a negative decision, then the display is updated to indicate that no gear change has occurred, but if the inquiry results in a positive decision, then the display is updated to indicate that the gear change has been made.

19. The method for manually shifting of claim 18 wherein the at least one manual shifter comprises at least one paddle shifter.

20. The method for manually shifting of claim 19 wherein a pair of paddle shifters is provided.

* * * * *